US011099997B2

(12) United States Patent
Tan et al.

(10) Patent No.: US 11,099,997 B2
(45) Date of Patent: Aug. 24, 2021

(54) DATA PREFETCHING METHOD AND APPARATUS, AND STORAGE DEVICE

(71) Applicant: HUAWEI TECHNOLOGIES CO., LTD., Guangdong (CN)

(72) Inventors: Chunhua Tan, Chengdu (CN); Weiqiang Jia, Hangzhou (CN); Ding Li, Hangzhou (CN); Wenqiang Yang, Chengdu (CN); Liyu Wang, Chengdu (CN); Pengli Ji, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/913,680

(22) Filed: Jun. 26, 2020

(65) Prior Publication Data

US 2020/0327061 A1 Oct. 15, 2020

Related U.S. Application Data

(63) Continuation of application No. PCT/CN2017/120200, filed on Dec. 29, 2017.

(51) Int. Cl.
*G06F 12/0862* (2016.01)
*G06F 12/0866* (2016.01)

(52) U.S. Cl.
CPC ...... *G06F 12/0862* (2013.01); *G06F 12/0866* (2013.01); *G06F 2212/1021* (2013.01); *G06F 2212/602* (2013.01)

(58) Field of Classification Search
CPC .......................... G06F 12/0862; G06F 12/0866

(Continued)

(56) References Cited

U.S. PATENT DOCUMENTS 5,557,734 A * 9/1996 Wilson ...................... G06T 1/20
345/505
9,354,989 B1 * 5/2016 Sehgal ................ G06F 11/3034
(Continued)

FOREIGN PATENT DOCUMENTS

CN 101266578 A 9/2008
CN 102023931 A 4/2011
(Continued)

OTHER PUBLICATIONS

Liu, "Research on Caching and Prefetching Technologies for Hierarchical Hybrid Storage Systems," China Doctoral Dissertation Full-text Database Information Technology Series, total 154 pages (Sep. 2013).

*Primary Examiner* — Jae U Yu (74) *Attorney, Agent, or Firm* — Leydig, Voit & Mayer, Ltd.

(57) ABSTRACT

In a data prefetching method, a storage device obtains a first sequence stream length and a first access count of a target logical block after execution of a first data access request is completed. When a second data access request is received, the storage device modifies the first sequence stream length to a second sequence stream length and modifies the first access count to a second access count. The storage device further calculates a sequence degree of the target logical block based on the second sequence stream length and the second access count, and performs a data prefetching operation when the sequence degree of the target logical block exceeds a first prefetch threshold.

22 Claims, 3 Drawing Sheets

(58) Field of Classification Search
USPC .............................................................. 711/3
See application file for complete search history.

(56) References Cited

U.S. PATENT DOCUMENTS

| | | |
|---|---|---|
| 2004/0003178 A1 | 1/2004 | Magoshi |
| 2014/0013027 A1* | 1/2014 | Jannyavula Venkata ................... G06F 12/0866 711/103 |
| 2017/0357587 A1 | 12/2017 | Jones, III |

FOREIGN PATENT DOCUMENTS

| | | |
|---|---|---|
| CN | 102111448 A | 6/2011 |
| CN | 102779098 A | 11/2012 |
| CN | 103635887 A | 3/2014 |
| CN | 104063330 A | 9/2014 |
| CN | 104156321 A | 11/2014 |
| CN | 106021128 A | 10/2016 |
| CN | 107273053 A | 10/2017 |

* cited by examiner

DATA PREFETCHING METHOD AND APPARATUS, AND STORAGE DEVICE

CROSS-REFERENCE TO RELATED APPLICATIONS

This application is a continuation of International Application No. PCT/CN2017/120200, filed on Dec. 29, 2017, the disclosure of which is hereby incorporated by reference in its entirety.

TECHNICAL FIELD

This application relates to the field of storage technologies, and in particular, to a data prefetching method and apparatus, and a storage device.

BACKGROUND

In a storage device, an access speed of a cache is higher than that of a hard disk. Therefore, during actual application, to-be-read data is usually predicted, and the predicted data is read from the hard disk into the cache in advance. When the storage device receives a read I/O request, the data to be read may be found in the cache (i.e., a cache hit), thereby greatly increasing the processing speed of the read I/O request. Prefetch timing depends on a prefetch algorithm, and if prefetching is not timely, a hit ratio is low, and efficiency is affected. Therefore, when to trigger a data prefetching operation becomes a problem that needs to be urgently resolved.

SUMMARY

This application provides a data prefetching method and apparatus, and a storage device, to accurately identify a parallel sequence stream, thereby triggering a data prefetching operation, and improving a data hit ratio.

A first aspect of this application provides a data prefetching method, where the method is applied to a storage device and includes: obtaining a first sequence stream length and a first access count of a target logical block after execution of a first data access request is completed, where the first data access request is used to access the target logical block, the first sequence stream length is a sum of a sequence stream length of the target logical block and a sequence stream length of a previous adjacent logical block of the target logical block, the first access count is a sum of an access count of the target logical block and an access count of the previous adjacent logical block, a cache of the storage device includes a plurality of logical blocks, and each of the target logical block and the adjacent logical block is one of the plurality of logical blocks; when a second data access request is received, modifying the first sequence stream length to a second sequence stream length and modifying the first access count to a second access count, where the second data access request is used to access the target logical block, the second sequence stream length is equal to a sum of the first sequence stream length and a length of the second data access request, and the second access count is equal to a sum of the first access count and a preset fixed value; calculating a sequence degree of the target logical block based on the second sequence stream length and the second access count; and performing a data prefetching operation when the sequence degree of the target logical block exceeds a first prefetch threshold.

In the data prefetching method provided in the first aspect, the sequence stream length and the access count of the target logical block are obtained after execution of a data access request is completed. In this case, the first sequence stream length of the target logical block is a sum of the sequence stream length of the target logical block and the sequence stream length of the previous adjacent logical block of the target logical block, and the access count is a sum of the access count of the target logical block and the access count of the previous adjacent logical block of the target logical block. The obtained sequence stream length and access count of the target logical block are used as a basis for next determining of whether to perform a prefetching operation. Based on a sequence degree calculated on this basis, a parallel sequence stream can be accurately identified, thereby triggering the data prefetching operation, and improving a data hit ratio.

In the data prefetching method provided in the first aspect, there may be two cases for the obtaining a first sequence stream length and a first access count of a target logical block. Case 1: It may be understood that, when the first data access request is being received, the sequence stream length and the access count of the target logical block also need to be modified. If the modification in this case already implements addition of the sequence stream length of the target logical block and the sequence stream length of the previous adjacent logical block of the target logical block, and addition of the access count of the target logical block and the access count of the previous adjacent logical block of the target logical block, when execution of the first data access request is completed, only the first sequence stream length and the first access count of the target logical block need to be obtained from the cache. If the modification does not include the sequence stream length of the previous adjacent logical block and the access count of the previous adjacent logical block when the first data access request is being received, after execution of the first data access request is completed, the sequence stream length and the access count of the target logical block need to be modified again, so that the obtained first sequence stream length of the target logical block is a sum of the sequence stream length of the target logical block and the sequence stream length of the previous adjacent logical block of the target logical block, and the first access count is a sum of the access count of the target logical block and the access count of the previous adjacent logical block of the target logical block.

With reference to the first aspect, in a first implementation of the first aspect, the first prefetch threshold is a prefetch threshold for performing the data prefetching operation within a first period. Either of the first data access request and the second data access request is a data access request received within the first period. The method further includes: calculating a second prefetch threshold based on a theoretical data hit ratio of the first period; and adjusting the first prefetch threshold to the second prefetch threshold, where the second prefetch threshold is a prefetch threshold for performing the data prefetching operation within a next period of the first period. When each period ends, the prefetch threshold may be recalculated based on a theoretical data hit ratio of a current period. If the calculated prefetch threshold is different from a prefetch threshold of the current period, the prefetch threshold of the current period needs to be adjusted, and the adjusted prefetch threshold is used as a prefetch threshold for performing the data prefetching operation in a next period. Compared with using a fixed prefetch threshold, periodically adjusting a prefetch threshold can better adapt to a processing capability of the storage device, thereby implementing a relatively high data hit ratio.

With reference to the first implementation of the first aspect, in a second implementation of the first aspect, the calculating a second prefetch threshold based on a theoretical data hit ratio of the first period includes: calculating the second prefetch threshold according to a preset formula, where the preset formula is hitRatio[1]−hitRatio[n]<T, hitRatio[1] is a theoretical data hit ratio when a prefetch threshold is 1 within the first period, hitRatio[n] is a theoretical data hit ratio when the prefetch threshold is n within the first period, T is preset hit ratio tolerance, and the second prefetch threshold n is equal to a maximum value satisfying the preset formula. Based on such an implementation, a prefetch threshold of a next period is obtained through calculation based on a theoretical data hit ratio of a current period, thereby ensuring a relatively high data hit ratio and a relatively low waste ratio.

With reference to the second implementation of the first aspect, in a third implementation of the first aspect, $$hitRatio[n] = \frac{\sum_{i=n+1}^{K} x_i}{\sum_{i=1}^{K} x_i},$$

where n represents the second prefetch threshold, K represents a preset maximum sequence degree threshold, and $x_n$ represents a quantity of data access requests with a sequence degree of n.

With reference to the first aspect, in a fourth implementation of the first aspect, the performing a data prefetching operation includes performing the data prefetching operation based on a first prefetch length, where the first prefetch length is a prefetch length for performing the data prefetching operation within the first period. The method further includes: calculating a second prefetch length; and adjusting the first prefetch length to the second prefetch length, where the second prefetch length is a prefetch length for performing the data prefetching operation within a next period of the first period. A prefetch length may be recalculated after each period ends. If the calculated prefetch length is different from a prefetch length of a current period, the prefetch length needs to be adjusted, and the adjusted prefetch length is used as a prefetch length for performing the data prefetching operation in the next period. Compared with using a fixed prefetch length, periodically adjusting a prefetch length can avoid a prefetch waste.

With reference to the fourth implementation of the first aspect, in a fifth implementation of the first aspect, the calculating a second prefetch length includes: obtaining a most frequently occurring sequence degree of sequence stream within the first period; and calculating the second prefetch length based on a sequence degree of the second data access request and the most frequently occurring sequence degree of sequence stream, where the sequence degree of the second data access request is a sequence degree obtained after the sequence degree of the target logical block is modified under the trigger of the second data access request, the sequence degree of the second data access request is equal to the sequence degree of the target logical block, and the sequence degree of sequence stream is a largest sequence degree of data access request.

With reference to the fifth implementation of the first aspect, in a sixth implementation of the first aspect, the calculating the second prefetch length based on a sequence degree of the second data access request and the most frequently occurring sequence degree of sequence stream includes: when the sequence degree of the second data access request is less than the most frequently occurring sequence degree of sequence stream, setting the second prefetch length to a result obtained by multiplying the length of the second data access request by a difference between the most frequently occurring sequence degree of sequence stream and the sequence degree of the second data access request.

With reference to the fifth implementation of the first aspect, in a seventh implementation of the first aspect, the calculating the second prefetch length based on a sequence degree of the second data access request and the most frequently occurring sequence degree of sequence stream includes: when the sequence degree of the second data access request is greater than or equal to the most frequently occurring sequence degree of sequence stream and less than a maximum sequence degree threshold, setting the second prefetch length to a product of a value M and the length of the second data access request, where M is a value greater than the sequence degree of the second data access request and less than the maximum sequence degree threshold, and M is a positive integer.

With reference to the fifth implementation of the first aspect, in an eighth implementation of the first aspect, the calculating the second prefetch length based on a sequence degree of the second data access request and the most frequently occurring sequence degree of sequence stream includes: when the sequence degree of the second data access request is greater than a maximum sequence degree threshold, setting the second prefetch length to a product of the maximum sequence degree threshold and the length of the second data access request.

With reference to the fourth implementation of the first aspect, in a ninth implementation of the first aspect, when the sequence degree of the second data access request is less than a maximum sequence degree threshold, whether F(n+1) is greater than a preset threshold is determined, and if F(n+1) is greater than the preset threshold, the prefetch length is a product of (n+1−n) and a length of the second data access request, where F(n+1) represents a quantity of sequence streams with a sequence degree of (n+1). If F(n+1) is not greater than the preset threshold, it is further determined whether F(n+2) is greater than the preset threshold, and if F(n+2) is greater than the preset threshold, the prefetch length is a product of (n+2−n) and an I/O size. The rest can be deduced by analogy. If even F(K) cannot satisfy the foregoing condition, prefetching is not performed or a very small length is prefetched, for example, the prefetch length is directly set to the length of the second data access request, where K represents the maximum sequence degree threshold, for example, 16. Like the fifth to the eighth implementations, the ninth implementation is also a prefetch length adjustment method, and can also avoid a prefetch waste.

A second aspect of this application provides a data prefetching apparatus. The apparatus is located in a storage device and configured to perform the first aspect and at least one method of the first aspect.

A third aspect of this application provides a storage device, configured to perform the first aspect and at least one method of the first aspect.

A fourth aspect of this application provides a computer program product, including a computer readable storage medium storing program code. An instruction included in the program code may be used to perform at least one method of the first aspect.

BRIEF DESCRIPTION OF DRAWINGS

To describe technical solutions in embodiments of the present invention more clearly, the following briefly describes the accompanying drawings required for the embodiments.

DESCRIPTION OF EMBODIMENTS

The technical solutions according to embodiments of the present invention are clearly and completely described in the following with reference to the accompanying drawings.

Figure 1:
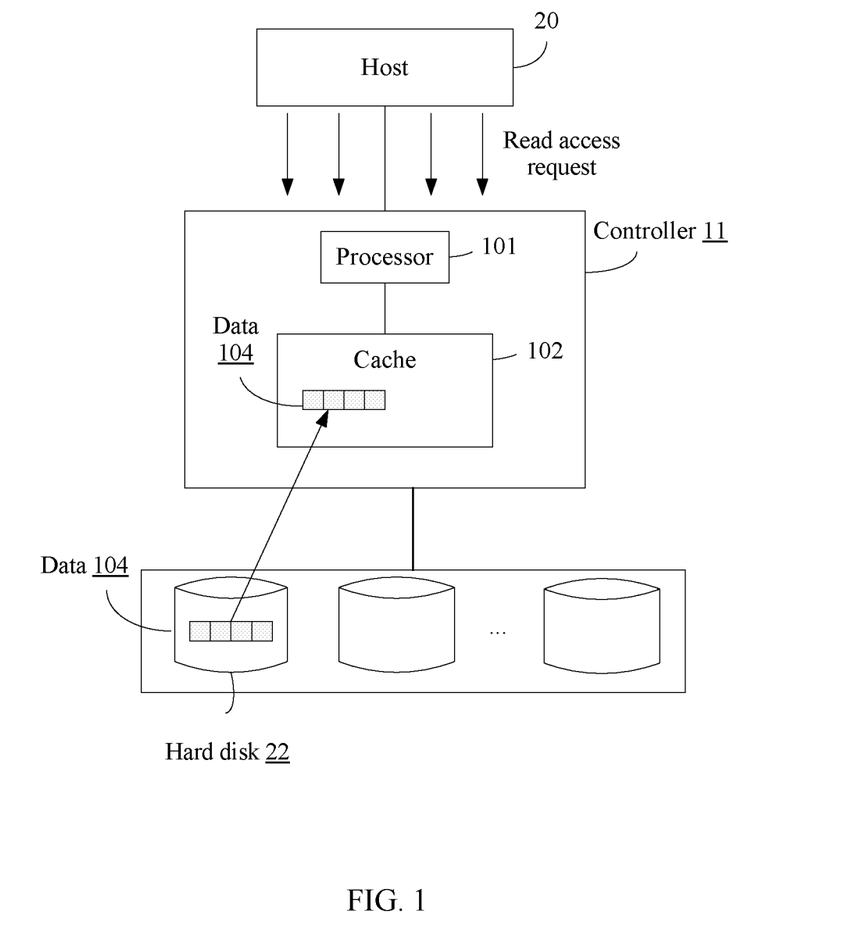
FIG. 1 is an architectural diagram of a system according to an embodiment of the present invention.

FIG. 1 is an architectural diagram of a system according to an embodiment of the present invention. The storage system provided in this embodiment includes a host 20, a controller 11, and a plurality of hard disks 22. The host 20 and the controller 11 communicate with each other by using the Network File System (English full name: Network File System, NFS for short in English)/Common Internet File System (English full name: Common Internet File System, CIFS for short in English) protocol or a fiber channel (English full name: Fiber Channel, FC for short in English) protocol. Specifically, the host 20 may send a write data request to the controller 11. After receiving the write data request, the controller 11 writes, into the hard disk 22, data carried in the write data request. In addition, the host 20 may further send a read data request to the controller 11. After receiving the read data request, the controller 11 searches a cache 102 of the controller 11 based on an address in the read data request to determine whether there is to-be-read data stored in the cache 102, and if there is the to-be-read data, directly sends the to-be-read data to the host 20, or if there is no to-be-read data, obtains the data from the hard disk 22 and sends the data to the host 20. During actual application, the controller 11 and the hard disk 22 may be integrated into one storage device, or may be located in two mutually independent devices. A location relationship between the controller 11 and the hard disk 22 is not limited in this embodiment of the present invention.

A read data request is used as an example. When a user initiates a large read data request on the host 20 or a client connected to the host 20, the host 20 usually splits the read data request into a plurality of requests and sends the plurality of requests to the controller 11 for processing. The operation of splitting the read data request into a plurality of requests may be performed by a host bus adapter (Host Bus Adapter, HBA) in the host 20, or may be performed by an HBA in the controller 11. Sizes of the requests obtained after splitting may be the same or may be different, and a size of a read data request obtained after splitting is not limited in this embodiment. For ease of description, in this embodiment, a request obtained before splitting is referred to as a read data request, and a request obtained after splitting is referred to as a data access request (or a read I/O request). In addition, logical addresses of a plurality of data access requests obtained after splitting are consecutive. The plurality of data access requests with consecutive logical addresses are referred to as a sequence stream. The host 20 may serially send the plurality of data access requests in the sequence stream to the controller 11 for processing, or may send the plurality of data access requests in the sequence stream in parallel to the controller 11 for processing. The sequence stream in which the data access requests are serially sent to the controller 11 for processing is referred to as a serial sequence stream, and the sequence stream in which the data access requests are sent in parallel to the controller 11 for processing is referred to as a parallel sequence stream. For the serial sequence stream, the host 20 sequentially sends each of the plurality of consecutive data access requests to the controller 11, and does not send a next data access request unless processing of a current data access request is completed. For the parallel sequence stream, the host 20 sends at least two of the plurality of consecutive data access requests to the controller 11, and the storage device may process the at least two data access requests in parallel. It is assumed that the host 20 sends nine data access requests to the controller 11. If the nine data access requests are to be serially processed, the host 20 first sends a first data access request, then sends a second data access request after receiving a response request for the first data access request, then sends a third data access request after receiving a response request for the second data access request, and so on, until processing of all the nine data access requests is completed. If the nine data access requests are to be processed in parallel, the host 20 may send a first data access request, a second data access request, and a third data access request to the controller 11 at the same time, and the controller 11 processes the three data access requests in parallel. After processing of the first data access request is completed, even if processing of the second data access request or the third data access request has not been completed, the host 20 may send a fourth data access request to the controller 11, and so on, until processing of all the nine data access requests is completed.

As shown in FIG. 1, the controller 11 provided in this embodiment includes at least a processor 101 and the cache 102.

The processor 101 is a central processing unit (English: central processing unit, CPU). In this embodiment of the present invention, the processor 101 may be configured to: receive a read data request and a write data request from the host 20, and process the read data request and the write data request.

The cache 102 is configured to temporarily store data received from the host 20 or data read from the hard disk 22. When receiving a plurality of write data requests sent by the host, the controller 11 may temporarily store data in the plurality of write data requests into the cache 102. When a capacity of the cache 102 reaches a threshold, data stored in the cache 102 is sent to the hard disk 22. The hard disk 22 stores the data. The cache 102 includes a volatile memory, a non-volatile memory, or a combination thereof. The volatile memory is, for example, a random access memory (English: random-access memory, RAM). The non-volatile memory is, for example, a floppy disk, a hard disk, a solid state disk (solid state disk, SSD), an optical disc, or any other machine readable/writable medium that can store program code.

It may be understood that, a speed of reading data from the cache 102 is higher than a speed of reading data from the hard disk 22. Therefore, if data to be accessed based on the data access request is hit in the cache 102, the data does not need to be read from the hard disk 22, thereby improving data reading efficiency. To improve a data hit ratio of the cache, a piece of data (for example, data 104 shown in FIG. 1) is usually pre-read from the hard disk 22, and written to the cache 102. In this case, when the host 20 sends a data access request to the controller 11 to request to read the data 104, because the data 104 is pre-read to the cache 102, the processor 101 may directly send the data 104 to the host 20. Although the data hit ratio of the cache can be improved when some data in the hard disk 22 is prefetched to the cache 102 before the data access request sent by the host 20 reaches the cache 102, inappropriate prefetch timing or excessive prefetched data causes a waste of cache resources. Therefore, when to perform a data prefetching operation and an amount of data to be prefetched are very important issues for the data prefetching operation.

First, in this embodiment, space of the cache 102 may be divided into a plurality of logical blocks (chunk), and sizes of the logical blocks are the same. In this embodiment, for example, a size of a logical block is 128 KB, and each logical block has a logical address. When the controller 11 receives a data access request, the data access request includes a logical address of to-be-accessed data, and a logical block corresponding to the data access request may be determined based on the logical address. If the determined logical block stores the data, it indicates that the data access request is hit. If the determined logical block does not store the data, it indicates that the data access request is not hit, and the controller 11 needs to read the data from the hard disk 22, writes the data to the logical block, and then returns the data to the host 20.

Each logical block has at least two pieces of attribute information: one is a sequence stream length, and the other is an access count. The sequence stream length is a sum of a length of a data access request for accessing the logical block and a length of a data access request for accessing a logical block adjacent to the logical block, and an initial value of the sequence stream length is 0. The access count is a sum of a quantity of times that the logical block is accessed based on a data access request and a quantity of times that the logical block adjacent to the logical block is accessed based on a data access request, and an initial value of the access count is 0. The sequence stream length and the access count may be used to calculate a sequence degree of a logical block. The sequence degree of the logical block is a degree of continuous access based on a data access request. In addition, each logical block further has a marker bit, and the marker bit is used to indicate whether the logical block stores prefetched data. If the logical block is empty (does not store any data), the marker bit of the logical block is equal to 0. If the logical block stores prefetched data, the marker bit of the logical block is equal to 1. It may be understood that, after data is prefetched from the hard disk and written to a logical block, a marker bit of the logical block changes from 0 to 1.

During actual application, data prefetching manners include synchronous prefetching and asynchronous prefetching. The synchronous prefetching means that when a logical block is accessed but not hit, based on a logical address of currently to-be-accessed data, data with a logical address consecutive with the logical address of the to-be-accessed data is read from the hard disk and written to one or more logical blocks after the logical block that is not hit. The asynchronous prefetching means that when a logical block is accessed and hit, based on a logical address of currently to-be-accessed data, data with a logical address consecutive with the logical address of the to-be-accessed data is read from the hard disk and written to one or more logical blocks after the logical block that is hit. The one or more logical blocks after the logical block herein are one or more logical blocks whose logical addresses are consecutive with the logical address of the logical block that is not hit and whose logical addresses are greater than the logical address of the logical block that is not hit. For the synchronous prefetching and the asynchronous prefetching, prefetch timing is different, but descriptions of a second part and a third part of this embodiment are applicable to prefetch thresholds and prefetch lengths.

The following describes a first part of this embodiment: timing for performing a data prefetching operation. Usually, when a sequence degree of a logical block reaches a preset prefetch threshold, a data prefetching operation is triggered. How to calculate a sequence degree of a logical block is a key issue to be discussed in this part. Usually, a serial sequence stream and a parallel sequence stream are not distinguished during calculation of the sequence degree of the logical block, and the sequence degree of the logical block is updated when the logical block is accessed based on a data access request. This method is proper for the serial sequence stream because a plurality of logical blocks corresponding to one serial sequence stream are sequentially accessed. In other words, a second logical block is accessed based on a read I/O request only after a first logical block is accessed based on a read I/O request for accessing the first logical block, and so on. Correspondingly, sequence degrees of the logical blocks may also be updated sequentially, and updated sequence degrees can accurately reflect read I/O continuity. However, for the parallel sequence stream, read I/O requests for a plurality of logical blocks are not received serially, and may be processing for a read I/O request for accessing a next logical block already starts when a read I/O request for accessing a current logical block has not arrived. Therefore, in this embodiment, for the parallel sequence stream, a sequence degree of the logical block is updated not only when the read I/O request is received, but also when execution of the read I/O request is completed, so as to accurately reflect read I/O continuity.

Figure 2:
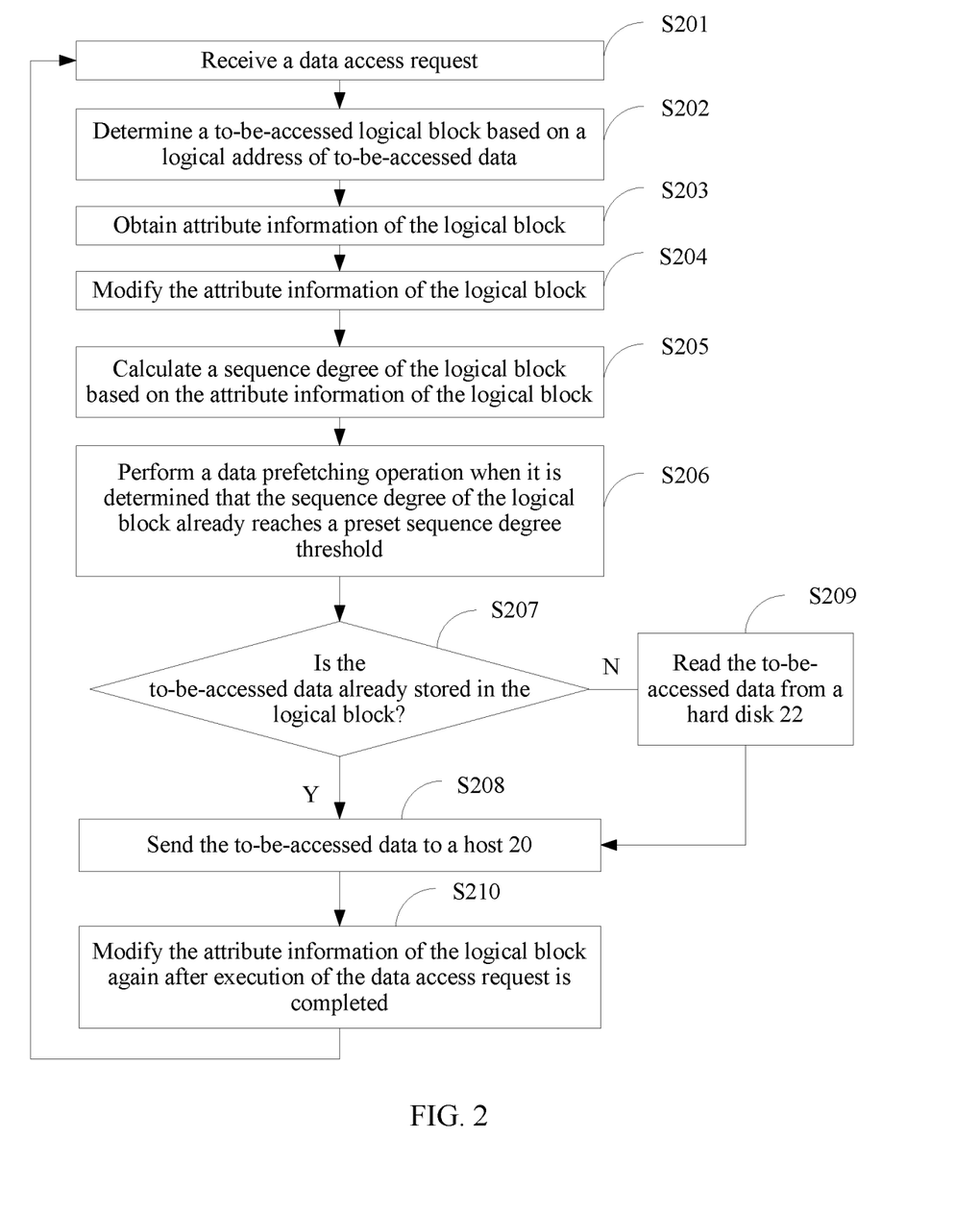
FIG. 2 is a schematic flowchart of a data prefetching method according to an embodiment of the present invention.

FIG. 2 is a schematic flowchart of a data prefetching method according to this embodiment. The data prefetching method may be applied to the controller 11 shown in FIG. 1. Unless otherwise specified, the following steps are all performed by the processor 101.

In S201, the processor 101 receives a data access request. The data access request may be generated after the host 20 splits a read data request, or may be obtained after the HBA inside the controller 11 splits a read data request that is sent by the host 20 and received by the controller 11. The data access request includes a logical address of to-be-accessed data, for example, a logical block address (Logical block Address, LBA), and a length (length).

During actual application, the processor 101 may receive a plurality of data access requests, and the plurality of data access requests are used to access a plurality of logical blocks. For example, a user triggers a read data request on the host 20 by using a client, to request to access data whose logical address is 0 KB to 512 KB. The host 20 splits the data access request into 16 data access requests, and a length of to-be-accessed data of each data access request is 32 KB. Using a parallel sequence stream as an example, the host 20 first sends four data access requests to the controller 11, where a logical address included in a data access request 1 is 0 KB to 31 KB, a logical address included in a data access request 2 is 128 KB to 159 KB, a logical address included in a data access request 3 is 256 KB to 287 KB, and a logical address included in a data access request 4 is 384 KB to 415 KB.

In S202, the processor 101 determines a to-be-accessed logical block based on the logical address.

Based on the example in step 201, after receiving the foregoing four data access requests, the controller 11 determines that a logical block to be accessed based on the data access request 1 is a logical block A (assuming that a logical address of the logical block A is 0 KB to 127 KB), a logical block to be accessed based on the data access request 2 is a logical block B (assuming that a logical address of the logical block B is 128 KB to 255 KB), a logical block to be accessed based on the data access request 3 is a logical block C (assuming that a logical address of the logical block C is 256 KB to 383 KB), and a logical block to be accessed based on the data access request 4 is a logical block D (assuming that a logical address of the logical block D is 384 KB to 511 KB).

In S203, the processor 101 obtains attribute information of the logical block. The attribute information of the logical block includes a sequence stream length and an access count. The attribute information may be prestored in the cache 102.

In S204, the processor 101 modifies the attribute information of the logical block. The logical block B is used as an example. First, whether an access count of the logical block B is 0 is determined. If the access count of the logical block B is 0, attribute information of a previous adjacent logical block (the logical block A) of the logical block B is obtained, and attribute information of the logical block B is modified based on the attribute information of the logical block A and a length of the data access request for accessing the logical block B. If the access count of the logical block B is greater than 0, attribute information of the logical block B is modified based on a length of the data access request for accessing the logical block B.

Specifically, when the access count of the logical block B is 0, the processor 101 modifies a sequence stream length of the logical block B based on a sequence stream length of the logical block A and the length of the data access request for accessing the logical block B, and modifies the access count of the logical block B based on an access count of the logical block A. A modified sequence stream length of the logical block B is equal to a sum of the sequence stream length of the logical block A and the length of the data access request 2. A modified access count of the logical block B is equal to the access count of the logical block A plus 1. If the access count of the logical block B is greater than 0, it indicates that a current sequence stream length of the logical block B already includes the sequence stream length of the logical block A. In this case, the sequence stream length of the logical block B may be directly modified by using the length of the data access request 2. A modified sequence stream length is a sum of the original sequence stream length of the logical block B and the length of the data access request 2. Similarly, when the access count of the logical block B is greater than 0, a modified access count is equal to the original access count plus 1. It should be noted that, the logical block A is a previous adjacent logical block of the logical block B. The previous adjacent logical block is a logical block whose logical address is consecutive with a logical address of a target logical block, or a logical block whose logical address is not absolutely consecutive with but close to a logical address of a target logical block. If a sequence stream in which the logical block A and the logical block B are located is an ascending sequence stream, the logical address of the logical block A is less than the logical address of the logical block B. If a sequence stream in which the logical block A and the logical block B are located is a descending sequence stream, the logical address of the logical block A is greater than the logical address of the logical block B. There is no essential difference between an ascending sequence stream and a descending sequence stream, and only directions of logical addresses are different.

Similarly, attribute information of another logical block may also be modified in the same manner. Refer to the following Table 1 and Table 2. Table 1 shows attribute information of the foregoing four logical blocks in an initial state. Table 2 shows information obtained after the attribute information of the four logical blocks is modified when the data access requests are received.

TABLE 1

| Logical block number | Sequence stream length | Access count |
| --- | --- | --- |
| A | 0 | 0 |
| B | 0 | 0 |
| C | 0 | 0 |
| D | 0 | 0 |

TABLE 2

| Data access request number | Logical block number | Sequence stream length | Access count |
| --- | --- | --- | --- |
| 1 | A | 32 | 1 |
| 2 | B | 32 or 64 | 1 or 2 |
| 3 | C | 32 or 64 or 96 | 1 or 2 or 3 |
| 4 | D | 32 or 64 or 96 | 1 or 2 or 3 or 4 |

As shown in Table 1, sequence stream lengths and access counts of the logical block A, the logical block B, the logical block C, and the logical block D are all 0 when the four logical blocks are in the initial state, that is, before the four logical blocks are accessed based on the data access requests.

As shown in Table 2, for the logical block A, because the access count in the initial state is 0, a sequence stream length of a previous adjacent logical block of the logical block A needs to be found. Assuming that the sequence stream length and an access count of the adjacent logical block of the logical block A are both 0, the modified sequence stream length of the logical block A is a value obtained by adding 0 and 32 KB (a length of the data access request 1). In addition, the access count of the logical block A is equal to a value obtained by adding 0 and 1. For the logical block B, because the access count is 0 in the initial state, the sequence stream length of the logical block A needs to be found. It should be noted that, because the four data access requests are used for accessing the logical block A, the logical block B, the logical block C, and the logical block D in parallel, when the logical block B receives the data access request 2, the logical block A probably has not received the data access request 1. In this case, the found sequence stream length of the logical block A is still the sequence stream length of the logical block A in the initial state, and the found access count of the logical block A is still the access count of the logical block A in the initial state. Therefore, the sequence stream length of the logical block B is equal to a value obtained by adding 0 and 32 KB (the length of the data access request 2). The access count of the logical block B is equal to a value obtained by adding 0 and 1. In addition, if the access count of the logical block A has been modified to 1, the access count of the logical block B is equal to a value obtained by adding 1 and 1. Correspondingly, if the sequence stream length of the logical block A has been modified to 32 KB, the sequence stream length of the logical block B is 64 KB, a result obtained by adding the sequence stream length of the logical block A, namely 32 KB, and the length of the data access request 2 for accessing the logical block B, namely 32 KB. Therefore, the sequence stream length of the logical block B shown in Table 2 may be 32 KB, or may be 64 KB, and the access count of the logical block B may be 1, or may be 2. Similarly, for the logical block C, because the access count is 0 in the initial state, the sequence stream length of the logical block B needs to be found. In this case, the logical block B probably has not been accessed based on the data access request. Therefore, the sequence stream length of the logical block B is still 0. Otherwise, if the logical block B has been accessed based on the data access request, the sequence stream length of the logical block B is 32 KB or 64 KB. Therefore, the sequence stream length of the logical block C may be (0+32) KB or (32+32) KB or (64+32) KB. Similarly, if the logical block B has not been accessed based on the data access request, the access count of the logical block B is still 0. If the logical block B has been accessed based on the data access request, the access count of the logical block B is 1 or 2. Therefore, the access count of the logical block C may be (0+1) or (1+1) or (2+1). The modification of the attribute information of the logical block D is similar to the foregoing descriptions. Details are not described herein again.

In S205, the processor 101 calculates a sequence degree of the logical block based on the attribute information of the logical block.

In an implementation, the sequence degree of the logical block is calculated based on the sequence stream length of the logical block and a length of the data access request for accessing the logical block. Specifically, a ratio (indicated by Ratio) of the sequence stream length (indicated by SeqLen) of the logical block to the length (indicated by Size) of the data access request for accessing the logical block is first obtained. In this case, Ratio=SeqLen/Size. When the length of the data access request for accessing the logical block is less than an access request length threshold, the sequence degree of the logical block is equal to a smaller value of the access count (indicated by Counter) of the logical block B and the ratio. In other words, the sequence degree of the logical block=min(Counter, Ratio). When the length of the data access request for accessing the logical block is greater than or equal to the data access request length threshold, the sequence degree of the logical block is equal to the ratio. The length threshold herein is preset and prestored in the cache 102. The length threshold needs to be less than a size of the logical block, to indicate that the length of the data access request is relatively small. Calculation of a sequence degree of the logical block B is used as an example. A ratio of the sequence stream length of the logical block B to the length of the data access request for accessing the logical block B is 32/32=1. The length of the data access request is 32 KB, and a size of the logical block B is 128 KB. It is assumed that an access request length threshold is 64 KB. Because 32 KB is less than 64 KB, the sequence degree of the logical block B=min(Counter, Ratio). Because Ratio=32 KB/32 KB, and Counter=1, the sequence degree of the logical block B=min(1, 32 KB/32 KB), and a result is 1.

In S206, the processor 101 determines whether the sequence degree of the logical block reaches a preset prefetch threshold. If the sequence degree of the logical block reaches the preset prefetch threshold, the processor 101 performs a data prefetching operation; or if the sequence degree of the logical block does not reach the preset prefetch threshold, the data prefetching operation is skipped, and S207 is performed.

For example, if the preset prefetch threshold is equal to 1, and the sequence degree of the logical block B is equal to 1, the data prefetching operation is triggered. The data prefetching operation is: sending, by the controller 11, an instruction to the hard disk 22, to request to read data corresponding to a logical address, and then storing the read data into a logical block corresponding to the logical address in the cache 102. Data in the hard disk 22 is read based on sectors (sector). Usually, a size of a sector is less than the size of the logical block. A length of prefetched data is to be described in detail in a subsequent part of this embodiment.

In S207, the processor 101 determines whether the logical block already stores to-be-accessed data, and if the logical block already stores the to-be-accessed data, performs S208; if the logical block does not store the to-be-accessed data, performs S209.

In S208, because the logical block already stores the to-be-accessed data, the processor 101 directly sends the to-be-accessed data to the host 20, and execution of the data access request is completed.

In S209, because the logical block does not store the to-be-accessed data, the processor 101 needs to read the to-be-accessed data from the hard disk 22 and store the to-be-accessed data into the logical block, and then performs S208 of sending the to-be-accessed data to the host 20. Execution of the data access request is completed after the sending.

In S210, after the execution of the data access request is completed, the attribute information of the logical block is modified again (S210).

The four data access requests described in S202 are still used as an example. The four data access requests are processed in parallel, and a time at which execution of the data access request 1 is completed may be after a time at which execution of the data access request 2 is completed. Therefore, if the attribute information of the logical block is modified only when the data access request is received, the sequence stream length of the logical block may represent only a part of a sequence stream in which the logical block is located, and does not represent another part of the sequence stream. The another part refers to a sequence stream length of a logical block adjacent to the logical block. During actual application, when the execution of the data access request for accessing the logical block is completed, update of the sequence stream length of the logical block adjacent to the logical block is usually also completed. For example, the sequence stream length of the previous adjacent logical block (the logical block A) of the logical block B is not updated when the data access request 2 is received, but update of the sequence stream length of the logical block A is completed when processing of the data access request 2 is completed. Therefore, in this embodiment of the present invention, after execution of a data access request for accessing a logical block is completed, attribute information of the logical block is modified again. Attribute information obtained after this modification is used to indicate continuity of the logical block and a logical block adjacent to the logical block. Specifically, a modified sequence stream length of the logical block is equal to a value obtained by adding the original sequence stream length of the logical block and a sequence stream length of a previous adjacent logical block. A modified access count of the logical block is equal to a value obtained by adding the original access count of the logical block and an access count of the previous adjacent logical block.

It should be noted that, as shown in Table 2, there are a plurality of possibilities for the sequence stream lengths and the access counts of the logical block B, the logical block C, and the logical block D. This is because when a logical block is accessed based on a data access request, attribute information of the logical block needs to be modified, but attribute information of a previous adjacent logical block of the logical block may not have been modified or may have been modified. Although there are a plurality of possibilities for the sequence stream lengths and the access counts of the logical block B, the logical block C, and the logical block D in Table 2, when the attribute information of these logical blocks is modified again after execution of the data access requests is completed, it needs to be ensured that attribute information obtained after this modification is obtained through modification based on attribute information of a previous adjacent logical block (only in this way, continuity of the logical block and the previous adjacent logical block can be reflected). For example, for the logical block B, when the attribute information of the logical block B is modified in S204, the logical block A probably has not been accessed based on the data access request. Therefore, the sequence stream length of the logical block B is 32, and the access count of the logical block B is 1. However, after the execution of the data access request for the logical block B is completed, the logical block A has definitely been accessed based on the data access request, and the attribute information of the logical block A has been modified as in S204. In this case, in S210, the modified sequence stream length of the logical block B is equal to a sum of the sequence stream length of the logical block A and the length of the data access request for accessing the logical block B, and the modified access count of the logical block B is equal to a sum of the access count of the logical block A and the original access count of the logical block B. It may be understood that, if the logical block A has been accessed based on the data access request when the attribute information of the logical block B is modified in S204, the sequence stream length of the logical block B is 64, and the access count of the logical block B is 2. In this case, the attribute information of the logical block B does not need to be modified again. Modification of the attribute information of the logical block C and the logical block D is similar to the modification of the attribute information of the logical block B, and is not described in detail again. Table 3 shows modified attribute information of the four logical blocks that is obtained after execution of the four data access requests is completed.

TABLE 3

| Data access request number | Logical block number | Sequence stream length | Access count |
|---|---|---|---|
| 1 | A | 32 | 1 |
| 2 | B | 64 | 2 |
| 3 | C | 128 | 3 |
| 4 | D | 192 | 4 |

It should be noted that, the modification of the attribute information of the logical block after the execution of the data access request is completed does not trigger the processor 101 to determine whether to perform the data prefetching operation. The modified attribute information is used as a basis for modifying the attribute information of the logical block when a next data access request is received. The logical block B is used as an example. When the controller 11 receives a next data access request (a data access request 5) that requests to access the logical block B, the processor 101 modifies the attribute information of the logical block B again. The modification manner is consistent with the modification manner described in S204. First, the processor 101 detects whether the access count of the logical block B is greater than 0. As shown in Table 3, the access count of the logical block B is 2. In this case, the modified sequence stream length of the logical block B is equal to a sum of the original sequence stream length of the logical block B and a length of the data access request 5. In addition, the access count of the logical block B is updated to 3. Then, the sequence degree of the logical block B is calculated in the manner in S205, and whether the sequence degree of the logical block B reaches the preset prefetch threshold determined in the manner in S206. If the sequence degree of the logical block B exceeds the preset prefetch threshold, the data prefetching operation is performed.

In this embodiment, the sequence stream length and the access count of the logical block are obtained after the execution of the data access request is completed. In this case, the sequence stream length of the logical block is the sum of the sequence stream length of the logical block and the sequence stream length of the previous adjacent logical block of the logical block. In this case, the access count is the sum of the access count of the logical block and the access count of the previous adjacent logical block of the logical block. The obtained sequence stream length and access count of the logical block are used as a basis for next determining of whether to perform a prefetching operation. Based on the sequence degree calculated on this basis, a parallel sequence stream can be accurately identified, thereby triggering the data prefetching operation.

The following describes a second part of this embodiment: how to adjust a prefetch threshold. The preset prefetch threshold in S206 in the embodiment shown in FIG. 2 is a value prestored in the cache 102. Whether the data prefetching operation should be triggered may be determined based on the prefetch threshold and the sequence degree. It should be noted that, the processor 101 may adjust the prefetch threshold, to ensure that a data hit ratio is relatively high and a waste ratio is relatively low. Prefetch thresholds in a same period are the same. Prefetch thresholds in different periods may be the same or may be different. The period refers to a same time interval. In this embodiment of the present invention, the period may be managed by a timer. When each period ends or when a first data access request in each period is received, whether the prefetch threshold needs to be adjusted is determined. For example, if duration of each period is 150 s, a $1^{st}$ second to a $150^{th}$ second is a first period, a $151^{st}$ second to a $300^{th}$ second is a second period, and so on. In this embodiment, a prefetch threshold of a next period may be calculated based on a theoretical data hit ratio in a current period. If the calculated prefetch threshold of the next period is different from a prefetch threshold of the current period, the prefetch threshold is adjusted.

In this embodiment, a stage-by-stage comparison method is used to calculate the prefetch threshold. The stage-by-stage comparison method is to determine, by comparing, stage by stage, theoretical hit ratios available when different prefetch thresholds trigger prefetching, whether a given hit ratio may be sacrificed to reduce a probability of a prefetch waste caused by a random I/O collision, thereby achieving a more refined adjustment of the prefetch threshold. A main process of the stage-by-stage comparison method is: using a maximum prefetch threshold as a start point and a reference prefetch threshold as an end point, to traverse, stage by stage, and calculate differences between hit ratios under different prefetch thresholds and a hit ratio under the reference prefetch threshold. If a difference is less than a threshold, a currently traversed prefetch threshold is used as the prefetch threshold of the current period.

The sequence degree of the logical block is described above. Herein, a sequence degree of a data access request is described by using the sequence degree of the logical block. As can be learned from the foregoing description, the sequence degree of the logical block changes when there is access based on a data access request. For example, in S204 shown in FIG. 2, when the logical block B is accessed based on the data access request 2, the sequence stream length and the access count of the logical block B are modified. Correspondingly, because the sequence degree of the logical block is obtained through calculation by using the sequence stream length and the access count, when the sequence stream length and the access count of the logical block B are modified, the sequence degree of the logical block B is also recalculated. Therefore, the change in the sequence degree of the logical block is triggered by the data access request. In this embodiment of the present invention, a sequence degree that is obtained through recalculation triggered by a data access request is referred to as a sequence degree of the data access request. Correspondingly, a sequence stream length that is obtained through recalculation triggered by a data access request is referred to as a sequence stream length of the data access request, and an access count obtained through recalculation triggered by a data access request is referred to as an access count of the data access request.

Similar to the sequence degree of the logical block, the sequence degree of the data access request is also obtained through calculation by using the sequence stream length and the access count. The calculation manner of the sequence degree of the data access request is as follows.

When the length of the data access request is less than a preset length threshold (for example, 32 KB), the sequence degree of the data access request is equal to the access count of the data access request. When the length of the data access request is greater than or equal to a preset length threshold, the sequence degree of the data access request is equal to a ratio of the sequence stream length of the data access request to the length of the data access request. Usually, a value of the sequence degree should not be too large. Therefore, in this embodiment, a maximum sequence degree threshold is set, for example, 16. If the calculated sequence degree of the data access request exceeds the maximum sequence degree threshold 16, the sequence degree of the data access request is directly set to 16.

In this embodiment, for each sequence degree, a quantity of data access requests with the sequence degree is counted. For example, a quantity of data access requests with a sequence degree of 1 is 200, a quantity of data access requests with a sequence degree of 2 is 100, a quantity of data access requests with a sequence degree of 3 is 50, and so on, until a quantity of data access requests with the sequence degree being equal to the maximum sequence degree threshold (for example, 16) is counted. Counting of the quantity of data access requests with each sequence degree is for predicting a theoretical data hit ratio. In this embodiment, hitRatio [n] is used to indicate a theoretical data hit ratio when the prefetch threshold is n, and $x_n$ is used to indicate a quantity of data access requests with a sequence degree of n, where a value range of n is [1, K], and K represents the maximum sequence degree threshold, for example, 16. In this case, a calculation formula (which is referred to as a formula 1) of the theoretical data hit ratio is as follows:

$$hitRatio[n] = \frac{\sum_{i=n+1}^{K} x_i}{\sum_{i=1}^{K} x_i}.$$

The prefetch threshold is a sequence degree threshold. When the prefetch threshold is n, it indicates that the sequence degree threshold is n. This means that the data prefetching operation is performed starting from an $n^{th}$ data access request of a sequence stream (a data hit is implemented starting from an $(n+1)^{th}$ data access request).

Obviously, based on the formula of hitRatio[n], theoretically, a smaller value of n indicates a larger value of hitRatio[n]. However, during actual application, a smaller value of n indicates a larger prefetch waste ratio. Therefore, a prefetch threshold m needs to be found, so that a value of hitRatio[m] is relatively large, and a prefetch waste ratio falls within a tolerable range. In this embodiment, hitRatio [m] needs to satisfy the following formula (which is referred to as a formula 2):

hitRatio[1]−hitRatio[m]<T.

hitRatio[1] is a theoretical data hit ratio in a current period under the assumption that the prefetch threshold is 1, and T is preset hit ratio tolerance, and is usually set to a relatively small value that is greater than 0 and less than 0.1 (for example, 5%). A prefetch threshold obtained through calculation is a maximum value of m satisfying the formula 2.

After the prefetch threshold m is obtained through calculation, the prefetch threshold may be used in a next period to determine whether to trigger a data prefetching operation. To prevent an I/O model from being inconsistent with an expectation, or to prevent the calculated prefetch threshold from being too high or low due to a change in an I/O model, the prefetch threshold m may be further corrected in real time. The correction is performed with reference to two factors: 1. an actual data hit ratio; and 2. an actual prefetch waste ratio. It should be noted that, the data hit ratio calculated according to the formula 1 is a predicted theoretical data hit ratio that may be different from the actual data hit ratio. Whether to correct the prefetch threshold is determined with reference to the factors of the actual data hit ratio and the actual prefetch waste ratio. It may be understood that, the actual data hit ratio is a ratio of actually hit data access requests to all data access requests in the current period, and a sum of the actual data hit ratio and the actual prefetch waste ratio is equal to 1. Specifically, the prefetch threshold m is adjusted in the following two cases.

Case 1: If the actual data hit ratio is less than a preset first threshold, and the actual prefetch waste ratio is greater than a preset second threshold, recalculation is performed according to the formula 2 by reusing statistical information of the current period, to obtain a prefetch threshold p. If the prefetch threshold p is greater than the prefetch threshold m, the prefetch threshold p is used as an adjusted prefetch threshold; or if the prefetch threshold p is less than or equal to the prefetch threshold m, a result obtained by adding m and a fixed value (which is usually 1) is used as an adjusted prefetch threshold.

Case 2: If the actual prefetch waste ratio is less than a preset third threshold, and the actual data hit ratio is less than a preset fourth threshold, recalculation is performed according to the formula 2 by reusing statistical information of the current period, to obtain a prefetch threshold q. If the prefetch threshold q is less than the prefetch threshold m, the prefetch threshold q is used as an adjusted prefetch threshold; or if the prefetch threshold q is greater than or equal to the prefetch threshold m, a result obtained by subtracting a fixed value (which is usually 1) from m is used as an adjusted prefetch threshold. In addition, it further needs to be ensured that the prefetch threshold is not a negative number.

A third part of this embodiment is about adjustment of a prefetch length. The prefetch length determines a prefetch waste ratio. By default, the prefetch length is equal to a product of a sequence degree of a data access request and a length (represented by an I/O size) of the data access request. If data is prefetched by default in any case, a prefetch waste is caused.

Similar to the prefetch threshold described above, the processor 101 may adjust the prefetch length in every period to better avoid a prefetch waste. Herein, a definition of the period is consistent with the foregoing description. Adjustment of the prefetch length is triggered when each period ends or when a first data access request in each period is received.

Figure 3:
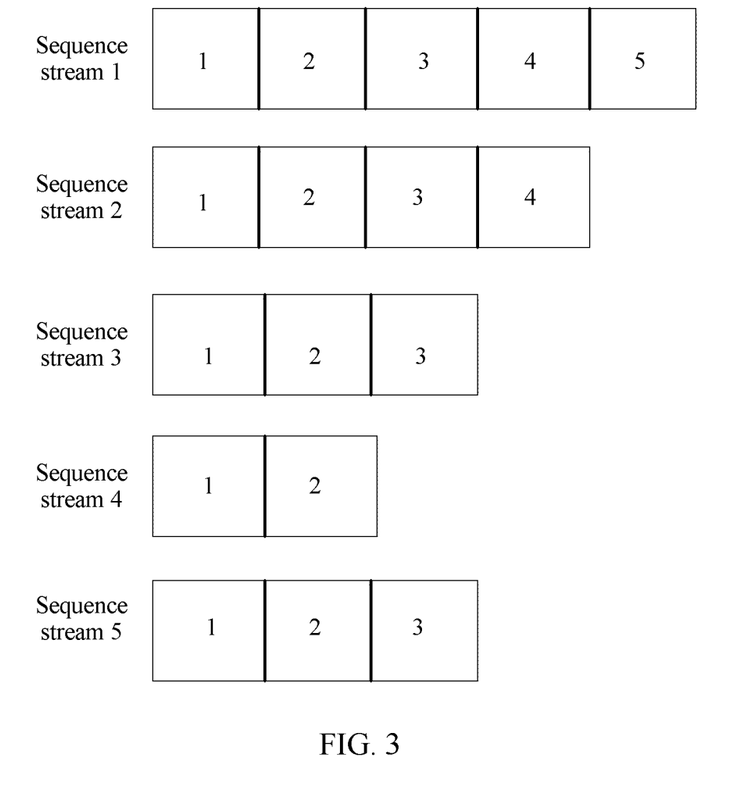
FIG. 3 is a schematic diagram of sequence degrees of read I/O requests included in sequence streams according to an embodiment of the present invention.

First, a most frequently occurring sequence degree of sequence stream among all sequence streams needs to be obtained. Referring to the example of FIG. 3, in a sequence stream 1, a sequence degree of a first read I/O request is 1, a sequence degree of a second read I/O request is 2, a sequence degree of a third read I/O request is 3, a sequence degree of a fourth read I/O request is 4, and a sequence degree of a fifth read I/O request is 5. Because a sequence degree of a sequence stream depends on a largest sequence degree of read I/O request, a sequence degree of the sequence stream 1 is equal to 5. In a sequence stream 2, a sequence degree of a first read I/O request is 1, a sequence degree of a second read I/O request is 2, a sequence degree of a third read I/O request is 3, and a sequence degree of a fourth read I/O request is 4. Therefore, a sequence degree of the sequence stream 2 is 4. In a sequence stream 3, a sequence degree of a first read I/O request is 1, a sequence degree of a second read I/O request is 2, and a sequence degree of a third read I/O request is 3. Therefore, a sequence degree of the sequence stream 3 is 3. In a sequence stream 4, a sequence degree of a first read I/O request is 1, and a sequence degree of a second read I/O request is 2. Therefore, a sequence degree of the sequence stream 2 is equal to 2. A case of a sequence stream 5 is similar to that of the sequence stream 3. It can be seen from FIG. 4 that, a most frequently occurring sequence degree of sequence stream is 3. However, during actual application, a most frequently occurring sequence degree among all sequence streams may be calculated by using a formula. Herein, $F(n)$ is used to indicate a quantity of sequence streams with a sequence degree of n, and $X(n)$ is used to indicate a quantity of data access requests with a sequence degree of n, where $F[n]=x_n-x_{n+1}$, and a value range of n is [1, K−1]. It should be noted that, a quantity of data access requests with each sequence degree still needs to be counted. Consistent with the content of counting, for each sequence degree, the quantity of data access requests with the sequence degree in the second part, a statistical result obtained when a prefetch threshold is calculated may be directly used. Therefore, according to the formula, a quantity of sequence streams with a sequence degree of 5 is $F(5)=X(5)-X(6)=X(5)-0=1$, a quantity of sequence streams with a sequence degree of 4 is $F(4)=X(4)-X(5)=2-1=1$, a quantity of sequence streams with a sequence degree of 3 is $F(3)=X(3)-X(4)=4-2=2$, a quantity of sequence streams with a sequence degree of 2 is $F(2)=X(2)-X(3)=5-4=1$, and a quantity of sequence streams with a sequence degree of 1 is $F(1)=X(1)-X(2)=5-5=0$. As can be learned from this, the most frequently occurring sequence degree of sequence stream is 3.

In this embodiment, two methods are used to calculate the prefetch length. A method 1 includes the following three cases:

Case 1: When the sequence degree of the data access request is less than the most frequently occurring sequence degree of sequence stream, the prefetch length is equal to a result obtained by multiplying the length of the data access request by a difference between the most frequently occurring sequence degree of sequence stream and the sequence degree of the data access request.

Case 2: When the sequence degree of the data access request is greater than or equal to the most frequently occurring sequence degree of sequence stream, and the sequence degree of the data access request is less than the maximum sequence degree threshold (for example, 16), the prefetch length is equal to a result obtained by multiplying M by the length of the data access request, where M is a value greater than the sequence degree of the data access request and less than the maximum sequence degree threshold, and M is a positive integer.

Case 3: When the sequence degree of the data access request is greater than the maximum sequence degree threshold, the prefetch length is equal to a result obtained by multiplying the maximum sequence degree threshold by the length of the data access request.

In this way, adjusting the prefetch length based on different cases can avoid a prefetch waste. When the sequence degree of the data access request is less than the maximum sequence degree threshold, a method 2 may alternatively be used to calculate the prefetch length.

Specifically, when the sequence degree of the data access request is less than the maximum sequence degree threshold, whether $F(n+1)$ is greater than a preset threshold is determined, and if $F(n+1)$ is greater than the preset threshold, the prefetch length is a product of (n+1−n) and an I/O size. If $F(n+1)$ is less than or equal to the preset threshold, it is further determined whether $F(n+2)$ is greater than the preset threshold, and if $F(n+2)$ is greater than the preset threshold, the prefetch length is a product of (n+2−n) and an I/O size. The rest can be deduced by analogy, until determining is performed on $F(K)$. If even $F(K)$ cannot satisfy the foregoing condition, prefetching is not performed or a very small length of data is prefetched, such as: (1× an I/O size).

Obtaining the prefetch length by using the method can avoid a prefetch waste.

Figure 4:
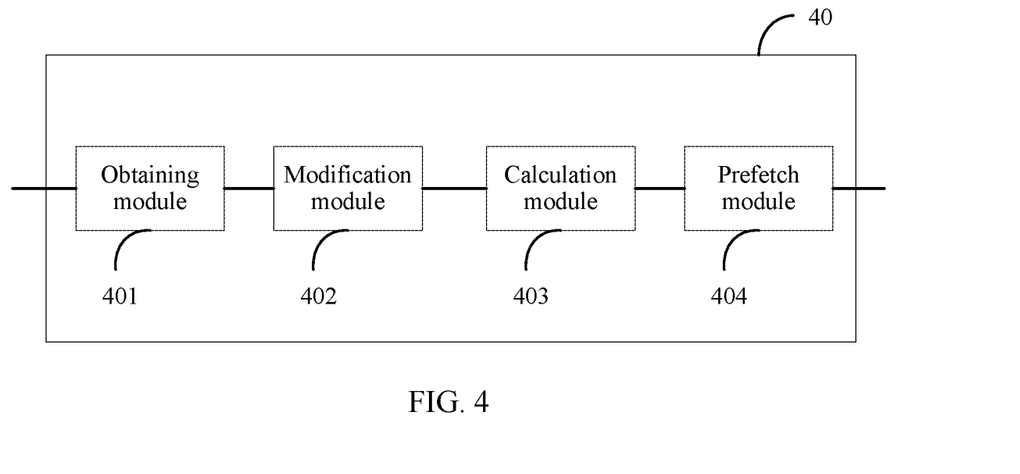
FIG. 4 is a schematic structural diagram of a data prefetching apparatus according to an embodiment of the present invention.

FIG. 4 is a schematic structural diagram of a data prefetching apparatus 40 according to an embodiment of the present invention. As shown in FIG. 4, the data prefetching apparatus 40 is located in a storage device and includes an obtaining module 401, a modification module 402, a calculation module 403, and a prefetch module 404.

The obtaining module 401 is configured to obtain a first sequence stream length and a first access count of a target logical block after execution of a first data access request is completed, where the first data access request is used to access the target logical block, the first sequence stream length is a sum of a sequence stream length of the target logical block and a sequence stream length of a previous adjacent logical block of the target logical block, the first access count is a sum of an access count of the target logical block and an access count of the previous adjacent logical block of the target logical block, a cache of the storage device includes a plurality of logical blocks, and each of the target logical block and the adjacent logical block is one of the plurality of logical blocks.

The modification module 402 is configured to: when a second data access request is received, modify the first sequence stream length to a second sequence stream length and modify the first access count to a second access count, where the second data access request is used to access the target logical block, the second sequence stream length is equal to a sum of the first sequence stream length and a length of the second data access request, and the second access count is equal to a sum of the first access count and a preset fixed value.

The calculation module 403 is configured to calculate a sequence degree of the target logical block based on the second sequence stream length and the second access count.

Specifically, the obtaining module 401 is further configured to obtain a ratio of the second sequence stream length to the length of the second data access request. The calculation module 403 is configured to obtain the sequence degree of the target logical block based on the ratio and the second access count. When the length of the second data access request is less than a data access request length threshold, the sequence degree of the target logical block is a smaller value of the second access count and the ratio, and the length threshold is less than a size of the target logical block; or when the length of the second data access request is greater than or equal to the length threshold, the sequence degree of the target logical block is equal to the ratio.

The prefetch module 404 is configured to perform a data prefetching operation when the sequence degree of the target logical block exceeds a first prefetch threshold.

The data prefetching apparatus 40 provided in this embodiment obtains a sequence stream length and an access count of a logical block after execution of a data access request is completed. In this case, the sequence stream length of the logical block is a sum of the sequence stream length of the logical block and a sequence stream length of a previous adjacent logical block of the logical block, and the access count is a sum of the access count of the logical block and an access count of the previous adjacent logical block of the logical block. The obtained sequence stream length and access count of the logical block are used as a basis for next determining of whether to perform a prefetching operation. Based on a sequence degree calculated on this basis, a parallel sequence stream can be accurately identified, thereby triggering a data prefetching operation.

During actual implementation, the obtaining module 401, the modification module 402, the calculation module 403, and the prefetch module 404 all may be implemented by the processor 101 shown in FIG. 1 by invoking the program code in the cache 102. For a specific execution process, refer to the description of the part of the data prefetching method shown in FIG. 2. Details are not described herein again.

Optionally, the first prefetch threshold is a prefetch threshold for performing the data prefetching operation within a first period. The data prefetching apparatus 40 provided in this embodiment may adjust the prefetch threshold, to ensure a relatively high data hit ratio and a relatively low waste ratio. For example, the calculation module 403 is further configured to: calculate a second prefetch threshold based on a theoretical data hit ratio of the first period; and adjust the first prefetch threshold to the second prefetch threshold, where the second prefetch threshold is a prefetch threshold for performing the data prefetching operation within a next period of the first period.

Optionally, the calculation module 403 is configured to calculate the second prefetch threshold n according to a preset formula, where the preset formula is hitRatio[1]−hitRatio[n]<T, hitRatio[1] is a theoretical data hit ratio when a prefetch threshold is 1 within the first period, hitRatio[n] is a theoretical data hit ratio when the prefetch threshold is n within the first period, T is preset hit ratio tolerance, and the second prefetch threshold n is a maximum value satisfying the preset formula.

Optionally, $$hitRatio[n] = \frac{\sum_{i=n+1}^{K} x_i}{\sum_{i=1}^{K} x_i},$$

where n represents the second prefetch threshold, K represents a preset maximum sequence degree threshold, and $x_n$ represents a quantity of data access requests with a sequence degree of n.

For a specific process in which the data prefetching apparatus 40 adjusts the prefetch threshold, refer to the description of the second part of this embodiment. Details are not described herein again.

In addition, the prefetch module 404 performs the data prefetching operation based on a first prefetch length, where the first prefetch length is a prefetch length for performing the data prefetching operation within the first period. The data prefetching apparatus 40 may further adjust the prefetch length, to avoid a prefetch waste.

Optionally, the calculation module 403 is further configured to: calculate a second prefetch length; and adjust the first prefetch length to the second prefetch length, where the second prefetch length is a prefetch length for performing the data prefetching operation within a next period of the first period.

Optionally, the calculation module 403 is configured to: obtain a most frequently occurring sequence degree of sequence stream within the first period; and calculate the second prefetch length based on a sequence degree of the second data access request and the most frequently occurring sequence degree of sequence stream, where the sequence degree of the second data access request is a sequence degree obtained after the sequence degree of the target logical block is modified under the trigger of the second data access request, the sequence degree of the second data access request is equal to the sequence degree of the target logical block, and the sequence degree of sequence stream is a largest sequence degree of data access request.

Optionally, the calculation module 403 is configured to: when the sequence degree of the second data access request is less than the most frequently occurring sequence degree of sequence stream, set the second prefetch length to a result obtained by multiplying the length of the second data access request by a difference between the most frequently occurring sequence degree of sequence stream and the sequence degree of the second data access request.

Optionally, the calculation module 403 is configured to: when the sequence degree of the second data access request is greater than or equal to the most frequently occurring sequence degree of sequence stream and less than a maximum sequence degree threshold, set the second prefetch length to a product of a value M and the length of the second data access request, where M is a value greater than the sequence degree of the second data access request and less than the maximum sequence degree threshold, and M is a positive integer.

Optionally, the calculation module 403 is configured to: when the sequence degree of the second data access request is greater than a maximum sequence degree threshold, set the second prefetch length to a product of the maximum sequence degree threshold and the length of the second data access request.

For a specific process in which the data prefetching apparatus 40 adjusts the prefetch length, refer to the description of the third part of this embodiment. Details are not described herein again.

A person of ordinary skill in the art may understand that, each aspect of the present invention or a possible implementation of each aspect may be specifically implemented as a system, a method, or a computer program product. Therefore, each aspect of the present invention or a possible implementation of each aspect may use forms of hardware only embodiments, software only embodiments (including firmware, resident software, and the like), or embodiments with a combination of software and hardware, which are collectively referred to as "circuit", "module", or "system" herein. In addition, each aspect of the present invention or a possible implementation of each aspect may take a form of a computer program product, where the computer program product refers to computer-readable program code stored in a computer-readable medium.

The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM, and an optical disc.

A processor in a computer reads the computer-readable program code stored in the computer-readable medium, so that the processor can execute each step in the flowchart or function actions specified in a combination of steps.

All computer-readable program code may be executed on a computer of a user, or some may be executed on a computer of a user as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two steps or blocks that depend on an involved function and are shown in sequence may be actually executed concurrently, or sometimes these blocks may be executed in reverse order.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person of ordinary skill in the art may use different methods to implement the described functions for each particular application, but it should not be considered that the implementation goes beyond the scope of the present invention.

The foregoing descriptions are merely specific embodiments of the present invention, but are not intended to limit the protection scope of the present invention. Any modification or replacement readily figured out by a person of ordinary skill in the art within the technical scope disclosed in the present invention shall fall within the protection scope of the present invention. Therefore, the protection scope of the present invention shall be subject to the protection scope of the claims.

What is claimed is:

1. A data prefetching method performed by a storage device, the method comprising:
    executing a first data access request to access a target data block;
    after executing the first data access request, obtaining a first summed length and a first summed count of the target logical block, wherein the first summed length is a sum of a sequence stream length of the target logical block and a sequence stream length of a previous adjacent logical block of the target logical block, the first summed count is a sum of an access count of the target logical block and an access count of the previous adjacent logical block, wherein the storage device has a cache comprising a plurality of logical blocks including the target logical block and the adjacent logical block, wherein the previous adjacent logical block is a logical block whose logical address is consecutive with a logical address of the target logical block, and wherein a sequence stream refers to a plurality of data access requests with consecutive logical addresses;
    receiving a second data access request to access the target logical block;
    in response to receiving the second data access request, calculating a second summed length and a second summed count, wherein the second summed length is a sum of the first summed length and a length of the second data access request, and the second summed count is a sum of the first summed count and a preset fixed value;
    calculating a sequence degree of the target logical block based on the second summed length and the second access count, wherein the sequence degree of the target logical block indicates a degree of continuous access based on a data access request; and
    performing a data prefetching operation in response to the sequence degree of the target logical block exceeding a first prefetch threshold.

2. The method according to claim 1, wherein the first prefetch threshold is for performing the data prefetching operation within a first period, and the method further comprises:
    calculating a second prefetch threshold based on a theoretical data hit ratio of the first period, wherein the second prefetch threshold is for performing a data prefetching operation within a next period of the first period; and
    adjusting the first prefetch threshold to the second prefetch threshold.

3. The method according to claim 2, wherein the calculating the second prefetch threshold based on the theoretical data hit ratio of the first period comprises:
    calculating the second prefetch threshold according to a preset formula, wherein the preset formula is hitRatio[1]−hitRatio[n]<T, hitRatio[1] is a theoretical data hit ratio when a prefetch threshold is 1 within the first period, n represents the second prefetch threshold, hitRatio[n] is a theoretical data hit ratio in response to the prefetch threshold is n within the first period, T is preset hit ratio tolerance, and the second prefetch threshold n is equal to a maximum value satisfying the preset formula.

4. The method according to claim 3, wherein $$hitRatio[n] = \frac{\sum_{i=n+1}^{K} x_i}{\sum_{i=1}^{K} x_i},$$

wherein K represents a preset maximum sequence degree threshold, and $x_n$ represents a quantity of data access requests with a sequence degree of n.

5. The method according to claim 1, wherein the performing the data prefetching operation comprises performing the data prefetching operation based on a first prefetch length, wherein the first prefetch length is for performing the data prefetching operation within a first period, and the method further comprises:
   calculating a second prefetch length; and
   adjusting the first prefetch length to the second prefetch length, wherein the second prefetch length is a prefetch length for performing the data prefetching operation within a next period of the first period.

6. The method according to claim 5, wherein the calculating the second prefetch length comprises:
   obtaining a most frequently occurring sequence degree of a sequence stream within the first period; and
   calculating the second prefetch length based on a sequence degree of the second data access request and the most frequently occurring sequence degree of the sequence stream,
      wherein the sequence degree of the second data access request is a sequence degree obtained after the sequence degree of the target logical block is modified under the trigger of the second data access request,
      wherein the sequence degree of the second data access request is equal to the sequence degree of the target logical block, and
      wherein the sequence degree of sequence stream is a largest sequence degree of data access request.

7. The method according to claim 6, wherein the calculating the second prefetch length comprises:
   in response to the sequence degree of the second data access request being less than the most frequently occurring sequence degree of the sequence stream, setting the second prefetch length to a result obtained by multiplying the length of the second data access request by a difference between the most frequently occurring sequence degree of the sequence stream and the sequence degree of the second data access request.

8. The method according to claim 6, wherein the step of calculating the second prefetch length comprises: in response to the sequence degree of the second data access request being greater than or equal to the most frequently occurring sequence degree of sequence stream and less than a maximum sequence degree threshold, setting the second prefetch length to a product of a value M and the length of the second data access request, wherein M is a value greater than the sequence degree of the second data access request and less than the maximum sequence degree threshold, and M is a positive integer.

9. The method according to claim 6, wherein the calculating the second prefetch length comprises:

in response to the sequence degree of the second data access request being greater than a maximum sequence degree threshold, setting the second prefetch length to a product of the maximum sequence degree threshold and the length of the second data access request.

10. The method according to claim 1, further comprising:
obtaining a ratio of the second summed length to the length of the second data access request, and
wherein the calculating the sequence degree of the target logical block comprises: obtaining the sequence degree of the target logical block based on the ratio and the second summed count.

11. The method according to claim 10, wherein:
in response to the length of the second data access request being less than a data access request length threshold, the sequence degree of the target logical block is a smaller value of the second access count and the ratio, and the length threshold is less than a size of the target logical block; or
in response to the length of the second data access request being greater than or equal to the length threshold, the sequence degree of the target logical block is equal to the ratio.

12. A storage device comprising:
a processor, and
a cache comprising a plurality of logical blocks,
wherein the processor is configured to:
execute a first data access request to access a target logical block;
after executing the first data access request, obtain a first summed length and a first summed count of the target logical block,
   wherein the first summed length is a sum of a sequence stream length of the target logical block and a sequence stream length of a previous adjacent logical block of the target logical block,
   wherein the first summed count is a sum of an access count of the target logical block and an access count of the previous adjacent logical block, and
   wherein each of the target logical block and the adjacent logical block is one of the plurality of logical blocks, wherein the previous adjacent logical block is a logical block whose logical address is consecutive with a logical address of the target logical block, and wherein a sequence stream refers to a plurality of data access requests with consecutive logical addresses;
receive a second data access request to access the target logical block,
in response to receiving the second data access request, calculate a second summed length and a second summed count, wherein the second summed length is a sum of the first summed length, and
   wherein a length of the second data access request, and the second summed count is a sum of the first summed count and a preset fixed value;
calculate a sequence degree of the target logical block based on the second sequence stream length and the second access count, wherein the sequence degree of the target logical block indicates a degree of continuous access based on a data access request; and
perform a data prefetching operation when the sequence degree of the target logical block exceeds a first prefetch threshold.

13. The storage device according to claim 12, wherein the first prefetch threshold is for performing the data prefetching operation within a first period, and the processor is further configured to: calculate a second prefetch threshold based on a theoretical data hit ratio of the first period, wherein the second prefetch threshold is for performing a data prefetching operation within a next period of the first period; and adjust the first prefetch threshold to the second prefetch threshold.

14. The storage device according to claim 13, wherein the processor is further configured to calculate the second prefetch threshold according to a preset formula, wherein the preset formula is hitRatio[1]−hitRatio[n] <T, hitRatio[1] is a theoretical data hit ratio when a prefetch threshold is 1 within the first period, n represents the second prefetch threshold, hitRatio[n] is a theoretical data hit ratio when the prefetch threshold is n within the first period, T is preset hit ratio tolerance, and the second prefetch threshold n is equal to a maximum value satisfying the preset formula.

15. The storage device according to claim 14, wherein $$hitRatio[n] = \frac{\sum_{i=n+1}^{K} x_i}{\sum_{i=1}^{K} x_i},$$

wherein K represents a preset maximum sequence degree threshold, and $x_n$ represents a quantity of data access requests with a sequence degree of n.

16. The storage device according to claim 12, wherein the processor is further configured to perform the data prefetching operation based on a first prefetch length, wherein the first prefetch length is for performing the data prefetching operation within a first period; and the processor is further configured to: calculate a second prefetch length; and adjust the first prefetch length to the second prefetch length, wherein the second prefetch length is a prefetch length for performing the data prefetching operation within a next period of the first period.

17. The storage device according to claim 16, wherein the processor is further configured to:

obtain a most frequently occurring sequence degree of a sequence stream within the first period; and calculate the second prefetch length based on a sequence degree of the second data access request and the most frequently occurring sequence degree of the sequence stream, wherein the sequence degree of the second data access request is a sequence degree obtained after the sequence degree of the target logical block is modified under the trigger of the second data access request, wherein the sequence degree of the second data access request is equal to the sequence degree of the target logical block, and wherein the sequence degree of the sequence stream is a largest sequence degree of data access request.

18. The storage device according to claim 17, wherein the processor is configured to:

in response to the sequence degree of the second data access request being less than the most frequently occurring sequence degree of sequence stream, set the second prefetch length to a result obtained by multiplying the length of the second data access request by a difference between the most frequently occurring sequence degree of the sequence stream and the sequence degree of the second data access request.

19. The storage device according to claim 17, wherein the processor is further configured to: in response to the sequence degree of the second data access request being greater than or equal to the most frequently occurring sequence degree of the sequence stream and less than a maximum sequence degree threshold, set the second prefetch length to a product of a value M and the length of the second data access request, wherein M is a value greater than the sequence degree of the second data access request and less than the maximum sequence degree threshold, and M is a positive integer.

20. The storage device according to claim 17, wherein the processor is further configured to: in response to the sequence degree of the second data access request being greater than a maximum sequence degree threshold, set the second prefetch length to a product of the maximum sequence degree threshold and the length of the second data access request.

21. The storage device according to claim 12, wherein the processor is further configured to obtain a ratio of the second summed length to the length of the second data access request, and the processor is further configured to obtain the sequence degree of the target logical block based on the ratio and the second access count.

22. The storage device according to claim 21, wherein in response to the length of the second data access request being less than a data access request length threshold, the sequence degree of the target logical block is a smaller value of the second access count and the ratio, and the length threshold is less than a size of the target logical block; or in response to the length of the second data access request being greater than or equal to the length threshold, the sequence degree of the target logical block is equal to the ratio.

* * * * *

UNITED STATES PATENT AND TRADEMARK OFFICE
CERTIFICATE OF CORRECTION

PATENT NO. : 11,099,997 B2
APPLICATION NO. : 16/913680
DATED : August 24, 2021
INVENTOR(S) : Tan et al.

It is certified that error appears in the above-identified patent and that said Letters Patent is hereby corrected as shown below:

On the Title Page

Applicant item (71): "HUAWEI TECHNOLOGIES CO., LTD., Guangdong (CN)" should read -- HUAWEI TECHNOLOGIES CO., LTD., Shenzhen (CN) --.

In the Claims

Claim 3: Column 22, Line 58: "3. The method according to claim 2, wherein the calcu-" should read -- 3. The method according to claim 2, wherein calcu- --.

Claim 5: Column 23, Line 14: "5. The method according to claim 1, wherein the perform-" should read -- 5. The method according to claim 1, wherein perform- --.

Claim 6: Column 23, Line 26: "6. The method according to claim 5, wherein the calcu-" should read -- 6. The method according to claim 5, wherein calcu- --.

Claim 7: Column 23, Line 44: "7. The method according to claim 6, wherein the calcu-" should read -- 7. The method according to claim 6, wherein calcu- --.

Claim 8: Column 23, Line 55: "the step of calculating the second prefetch length com-" should read -- calculating the second prefetch length com- --.

Claim 9: Column 23, Line 66: "9. The method according to claim 6, wherein the calcu-" should read -- 9. The method according to claim 6, wherein calcu- --.

Signed and Sealed this
Second Day of August, 2022

Katherine Kelly Vidal
*Director of the United States Patent and Trademark Office*